United States Patent
Cheng et al.

(10) Patent No.: US 8,594,813 B2
(45) Date of Patent: Nov. 26, 2013

(54) DREAM CONTROLLER

(75) Inventors: George Shu-Xing Cheng, Folsom, CA (US); Steven L. Mulkey, Cameron Park, CA (US); Qiang Wang, Sacramento, CA (US); Andrew J. Chow, Rancho Cordova, CA (US)

(73) Assignee: General Cybernation Group, Inc., Rancho Cordova, CA (US)

( * ) Notice: Subject to any disclaimer, the term of this patent is extended or adjusted under 35 U.S.C. 154(b) by 533 days.

(21) Appl. No.: 12/853,832

(22) Filed: Aug. 10, 2010

(65) Prior Publication Data
US 2011/0040393 A1 Feb. 17, 2011

Related U.S. Application Data

(60) Provisional application No. 61/234,206, filed on Aug. 14, 2009.

(51) Int. Cl.
*G06F 19/00* (2011.01)

(52) U.S. Cl.
USPC .............................................. 700/28; 700/42

(58) Field of Classification Search
CPC ................................ G05B 17/34; G05B 13/00
USPC ........ 700/28, 42, 49, 50, 53, 266; 706/14–15, 706/23–25
See application file for complete search history.

(56) References Cited

U.S. PATENT DOCUMENTS

| | | | |
|---|---|---|---|
| 6,055,524 A | 4/2000 | Cheng | |
| 6,360,131 B1 | 3/2002 | Cheng | |
| 6,535,795 B1 * | 3/2003 | Schroeder et al. | 700/266 |
| 6,556,980 B1 | 4/2003 | Cheng | |
| 6,684,112 B1 | 1/2004 | Cheng | |
| 6,684,115 B1 | 1/2004 | Cheng | |
| 7,016,743 B1 | 3/2006 | Cheng | |
| 7,142,626 B2 | 11/2006 | Cheng | |
| 7,152,052 B2 | 12/2006 | Cheng | |
| 7,415,446 B2 | 8/2008 | Cheng | |
| 2003/0044344 A1 * | 3/2003 | Saucedo et al. | 423/562 |

OTHER PUBLICATIONS

G.S. Cheng, Model-Free Adaptive (MFA) Control, 2006, Bela Liptak, p. 224-233.*
G.S Cheng, Model Free Adative control, Feb. 2001, Control Engineering Europe, Cahners Europe, p. 24-31.*
http:// www.Cybosoft.com (2006), Time-vary, flow control, Temp. control, pH controller, Inonlinear controller, pressure controlller. level controller.*
Archive-document, http:// www.Cybosoft.com (2006).*

* cited by examiner

Primary Examiner — Kidest Bahta
(74) Attorney, Agent, or Firm — Stout, Uxa, Buyan & Mullins, LLP

(57) ABSTRACT

A method and apparatus for intelligently controlling continuous process variables. A Dream Controller comprises an Intelligent Engine mechanism and a number of Model-Free Adaptive (MFA) controllers, each of which is suitable to control a process with specific behaviors. The Intelligent Engine can automatically select the appropriate MFA controller and its parameters so that the Dream Controller can be easily used by people with limited control experience and those who do not have the time to commission, tune, and maintain automatic controllers.

20 Claims, 12 Drawing Sheets

DREAM CONTROLLER

This application claims priority to U.S. Provisional Application No. 61/234,206, filed on Aug. 14, 2009, which is herein incorporated by reference.

This invention was made with government support under SBIR grant DE-FG02-08ER84944 awarded by the U.S. Department of Energy. The government has certain rights to the invention.

The subject of this patent relates to automatic control of simple to complex systems including industrial processes, equipment, facilities, buildings, devices, boilers, valve positioners, motion stages, drives, motors, turbines, compressors, engines, robotics, vehicles, and appliances, and more particularly to a method and apparatus for intelligently controlling continuous process variables.

The inventive Dream Controller can automatically select the appropriate controller type and its parameters based on the process information entered by the user. It consists of different types of Model-Free Adaptive (MFA) controllers, many of which have been disclosed and patented. The Dream Controller has sufficient adaptive and robust capability to control simple to complex processes providing consistent control performance without re-tuning of its parameters. It is able to deal with changes in process dynamics, load, disturbances, and other uncertainties.

Developed almost 70 years ago, the PID (Proportional-Integral-Derivative) controller is still the most widely used controller today. PID is simple, easy to understand and implement, and does not require a precise process model to launch. However, PID has many shortcomings: (1) PID works well for simple processes that are basically linear and time-invariant. (2) PID must be tuned properly. When the process dynamics or operating conditions change, PID may need re-tuning. In practice, tuning PID is often a frustrating experience. (3) PID has trouble controlling complex systems no matter how it is tuned.

PID controllers were originally developed on pneumatic systems that cannot really produce the integral and Derivative functions. Approximation formulas were used. PID went through the technology advances from pneumatic to analog, digital, and software based control systems. Different manufacturers may use different forms of PID formula and units. For instance, PID proportional gain is the controller gain but PID proportional band is the reciprocal of the PID gain in percent, which is not only confusing but also dangerous if the user does not pay attention to the difference. It is desirable to develop a general-purpose yet smart controller that can be easily used by people with limited control experience and those who do not have the time to commission, tune, and maintain automatic controllers.

First introduced in 1997, the Model-Free Adaptive (MFA) control technology overcomes the shortcomings of PID control and is able to control various complex processes that may have one or more of the following behaviors: (1) nonlinear, (2) time-varying, (3) large time delay, (4) multi-input-multi-output, (5) frequent dynamic changes, (6) open-loop oscillating, (7) pH process, and (8) processes with large load changes and disturbances.

Since MFA is "Model-Free", it also overcomes the shortcomings of model-based advanced control methods. MFA is an adaptive and robust control technology but it does not require (1) precise process models, (2) process identification, (3) controller design, and (4) complicated manual tuning of controller parameters. A series of U.S. patents and related international patents for Model-Free Adaptive (MFA) control and optimization technologies have been issued. Some of them, are listed in Table 1.

TABLE 1

| U.S. Pat. No. | Patent Name |
|---|---|
| 6,055,524 | Model-Free Adaptive Process Control |
| 6,556,980 | Model-Free Adaptive Control for Industrial Processes |
| 6,360,131 | Model-Free Adaptive Control for Flexible Production Systems |
| 6,684,115 | Model-Free Adaptive Control of Quality Variables (1) |
| 6,684,112 | Robust Model-Free Adaptive Control |
| 7,016,743 | Model-Free Adaptive Control of Quality Variables (2) |
| 7,142,626 | Apparatus and Method of Controlling Multi-Input-Single-Output Systems |
| 7,152,052 | Apparatus and Method of Controlling Single-Input-Multi-Output Systems |
| 7,415,446 | Model-Free Adaptive Optimization |

Commercial hardware and software products with Model-Free Adaptive control have been successfully installed in most industries and deployed on a large scale for process control, building control, and equipment control. However, in most cases, the user still has to select the appropriate MFA controller and enter certain parameters.

In this patent, we introduce a novel general-purpose yet smart MFA controller (the Dream Controller) designed to overcome the shortcomings of the prior art. The Dream Controller includes an Intelligent Engine and a number of MFA controllers, each of which is suitable to control a process with specific behaviors. The intelligent Engine can automatically select the appropriate MFA controller and its parameters. Therefore, the Dream Controller can be easily used by people with limited control experience and those who do not have the time to commission, tune, and maintain automatic controllers.

In this patent, the term "mechanism" is used to represent hardware, software, or any combination thereof. The term "process" is used to represent a physical system or process with inputs and outputs that have dynamic relationships. The term "program" is used to represent a sequence of instructions that a computer can interpret and execute. The term "initialization" is used to represent the procedure to set or prepare a mechanism to a starting position, value, or configuration. The term "routine" is used to represent a sequence of steps that can be executed repeatedly in a program. The term "Dream Controller" is used to represent the novel general-purpose Model-Free Adaptive (MFA) controller as part of the Intelligent MFA control system of this invention.

Without losing generality, all numerical values given in controller parameter configuration in this patent are examples. Other values can be used without departing from the spirit or scope of our invention.

DESCRIPTION

Figure 1:
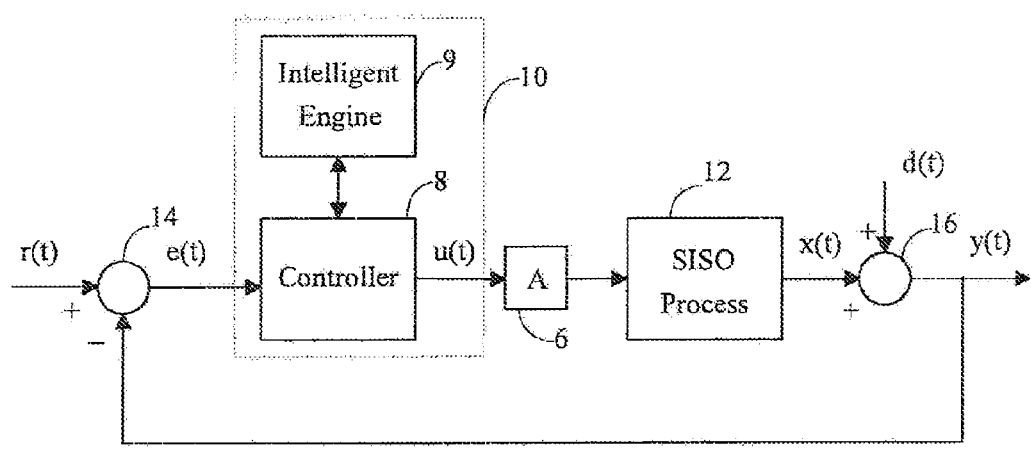
FIG. 1 is a block diagram illustrating a single-loop automatic control system comprising the Dream Controller according to this invention.

FIG. 1 is a block diagram illustrating a single-loop automatic control system comprising the Dream Controller according to this invention. It comprises the Dream Controller 10, an actuator 6, a single-input-single-output (SISO) process 12, and signal adders 14 and 16. The Dream Controller consists of a SISO MFA controller 8 and an Intelligent Engine 9. The signals shown in FIG. 1 are as follows:

r(t)—Setpoint,
y(t)—Measured Variable or the Process Variable, y(t)=x(t)+d(t).
x(t)—Process Output,
u(t)—Controller Output
d(t)—Disturbance, the disturbance caused by noise or load changes.
e(t)—Error between the Setpoint and Measured Variable, e(t)=r(t)−y(t).

The control objective is for the controller to produce an output u(t) to manipulate the actuator 6 so that the process variable y(t) tracks the given trajectory of its setpoint r(t) under variations of setpoint, disturbance, and process dynamics. In other words, the task of the MFA controller is to minimize the error e(t) in an online fashion.

The control objective function for the MFA control system is selected as $$E_S(t) = \frac{1}{2}e(t)^2 \qquad (1)$$
$$\frac{1}{2}[r(t) - y(t)]^2.$$

The minimization of $E_s(t)$ is achieved by (i) the regulatory control capability of the MFA controller, whose output u(t) manipulates the actuator forcing the process variable r(t) to track its setpoint r(t); and (ii) the adjustment of the MFA controller weighting factors that allow the controller to deal with the dynamic changes, large disturbances, and other uncertainties.

Figure 2:
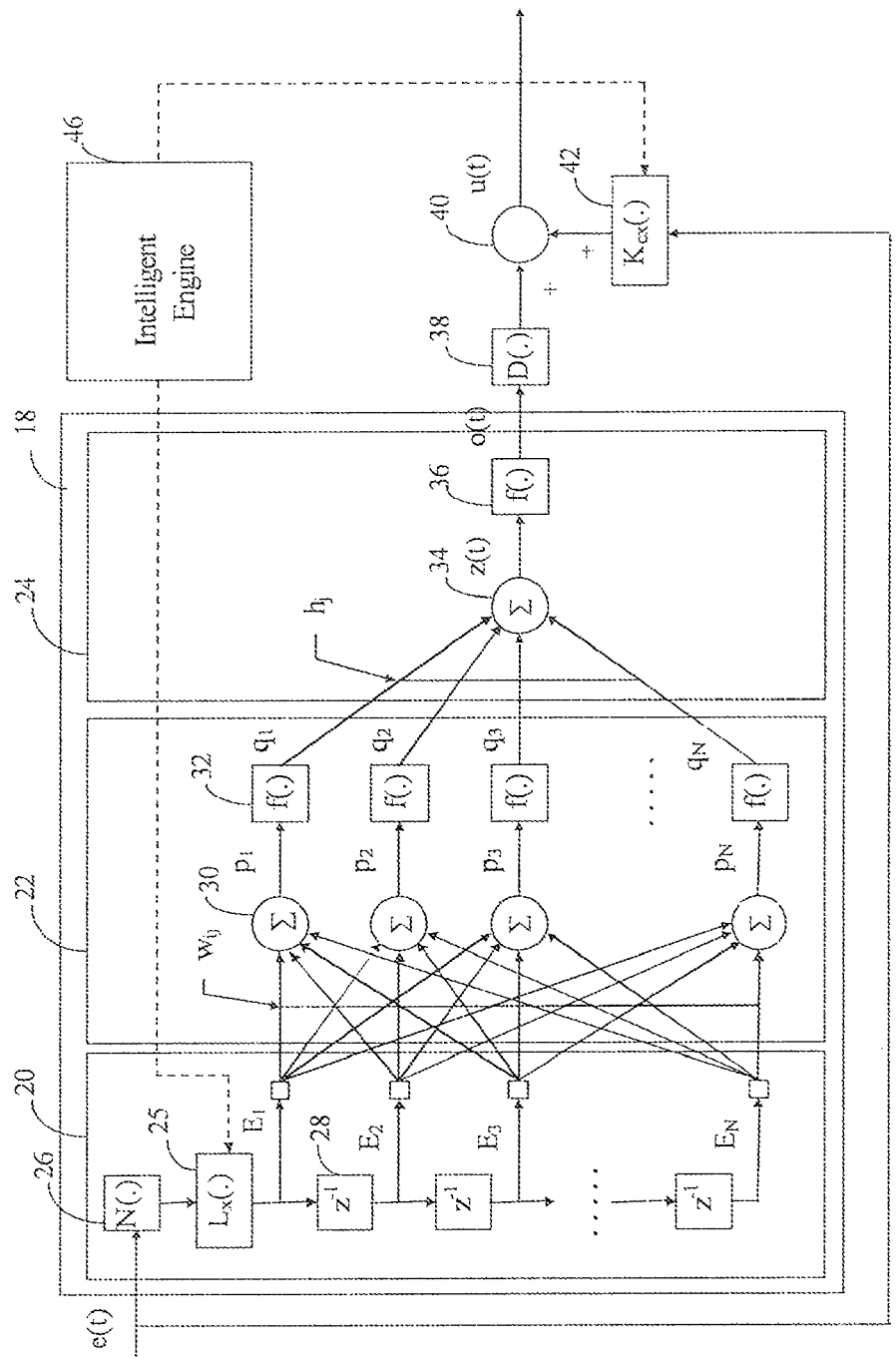
FIG. 2 is a block diagram illustrating the architecture of the Dream Controller in the basic form of a Model-Free Adaptive (MFA) controller.

FIG. 2 is a block diagram illustrating the architecture of the Dream Controller of this invention in the basic form of a Model-Free Adaptive (MFA) controller. A linear multilayer neural network 18 is used as a key component of the controller. The neural network has one input layer 20, one hidden layer 22 with N neurons, and one output layer 24 with one neuron.

The input signal e(t) to the input layer 20 is first converted to a normalized error signal $E_1$ with a range of −1 to 1 by using the normalization unit 26, where N(.) denotes a normalization function. The output of the normalization unit 26 is then scaled by a scaling function $L_x(.)$ 25

$$L_x(.) = \frac{K_{cx}}{T_{cx}}. \qquad (2)$$

The value of $E_1$ at time t is computed with function $L_x(.)$ and N(.):

$$E_1 = \frac{K_{cx}}{T_{cx}} N(e(t)), \qquad (3)$$

where $K_{cx}>0$ is defined as controller gain and $T_{cx}$ is the defined process time constant. $K_{cx}$ is used to compensate for the process steady-state gain and $T_{cx}$ provides information for the dynamic behavior of the process. When the error signal is scaled with these parameters, the controller's behavior can be manipulated by adjusting the parameters.

The $E_1$ signal then goes iteratively through a series of delay units 28, were $z^{-1}$ denotes the unit delay operator. A set of normalized and scaled error signals $E_2$ to $E_N$ is then generated. In this way, a continuous signal e(t) is converted to a series of discrete signals, which are used as the inputs to the neural network. These delayed error signals $E_i$, i=1, ... N, are then conveyed to the hidden layer through the neural network connections. This is equivalent to adding a feedback structure to the neural network. Then the regular static multilayer neural network becomes a dynamic neural network. A dynamic block is just another name for a dynamic system, whose inputs and outputs have dynamic relationships.

Each input signal can be conveyed separately to each of the neurons in the hidden layer 22 via a path weighted by an individual weighting factor $w_{ij}$, where i=1, 2, ... N, and j=1, 2, ... N. The inputs to each of the neurons in the hidden layer are summed by adder 30 to produce signal $p_j$. Then the signal $p_j$ is filtered by an activation function 32 to produce $q_j$ where j denotes the jth neuron in the hidden layer.

A piecewise continuous linear function $f(x)$ mapping real numbers to [0,1] used as the activation function in the neural network as defined by $$f(x) = 0, \quad \text{if } x < -\frac{b}{a} \qquad (4a)$$

$$f(x) = ax + b, \quad \text{if } -\frac{b}{a} \leq x \leq \frac{b}{a} \qquad (4b)$$

$$f(x) = 1, \quad \text{if } x > \frac{b}{a} \qquad (4c)$$

where a is an arbitrary constant and b=½.

Each output signal from the hidden layer is conveyed to the single neuron in the output layer 24 via a path weighted by an individual weighting factor $h_j$, where j=1, 2, ... N. These signals are summed in adder 34 to produce signal z(.), and then filtered by activation function 36 to produce the output o(.) of the neural network 18 with a range of 0 to 1.

A de-normalization function 38 defined by $$D(x) = 100x, \quad (5)$$

maps the o(.) signal back to the real space to produce the controller signal u(t).

The algorithm governing the input-output of the controller consists of the following difference equations:

$$p_j(n) = \sum_{i=1}^{N} w_{ij}(n) E_i(n), \quad (6)$$

$$q_j(n) = f(p_j(n)), \quad (7)$$

$$o(n) = f\left(\sum_{j=1}^{N} h_j(n) q_j(n)\right), \quad (8)$$

$$= a \sum_{j=1}^{N} h_j(n) q_j(n) + b,$$

where the variable of function $f(.)$ is in the range specified in Equation (4b), and o(n) is bounded by the limits specified in Equations (4a) and (4c). The controller signal u(t) becomes $$u(t) = K_{cx}(.)e(t) + D(o(t)) \quad (9)$$

$$= K_{cx}(.)e(t) + 100\left[a\sum_{j=1}^{N} h_j(n) q_j(n) + b\right],$$

where n denotes the nth iteration; o(t) is the continuous function of o(n); D(.) is the de-normalization function; and $K_{cx}(.) > 0$, the controller gain 42, is a variable used to adjust the magnitude of the control signal. This is the same variable as in the scaling function $L_x(.)$ 25 and is useful to fine tune the controller performance or keep the system stable.

An online learning algorithm as described in the U.S. Pat. No. 6,556,980 B1 is an example of one algorithm that can be used to continuously update the values of the weighting factors of the MFA controller as follows:

$$\Delta w_{ij}(n) = a^2 \eta e(n) E_i(n) h_i(n), \quad (10)$$

$$\Delta h_j(a) = a \eta e(n) q_j(n). \quad (11)$$

The equations (1) through (11) work for both process direct-acting or reverse acting types. Direct-acting means that an increase in the process input will cause its output to increase, and vice versa. Reverse-acting means that an increase in the process input will cause its output to decrease, and vice versa. To keep the above equations working for both direct and reverse acting cases, e(t) is calculated differently based on the acting type of the process as follows:

$$e(t) = r(t) - y(t), \text{ if direct acting} \quad (12a)$$

$$e(t) = -[r(t) - y(t)], \text{ if reverse acting} \quad (12b)$$

Based on user entered information such as Process Type and Control Problems, the Intelligent Engine 46 can automatically enter the pre-determined controller gain $K_c$ 42 and time constant $T_c$ inside the scaling function $L_x(.)$ 25.

Figure 3:
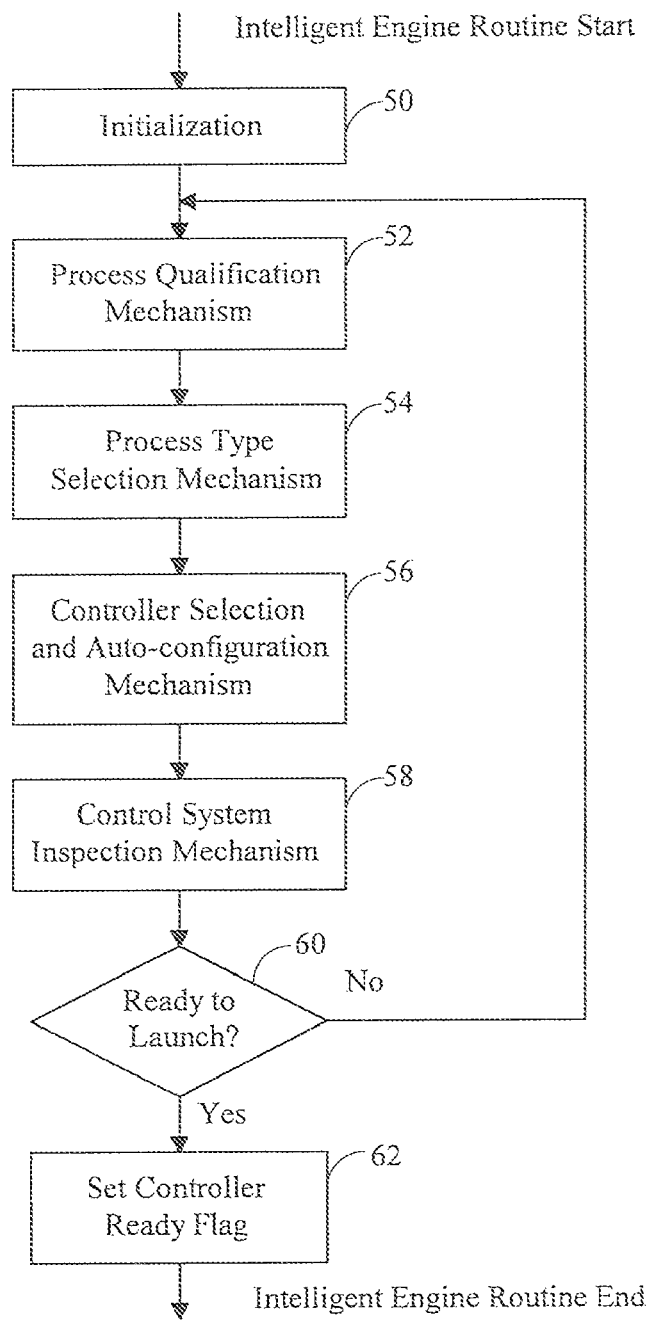
FIG. 3 is a flow chart describing the steps in an Intelligent Engine mechanism according to this invention.

FIG. 3 is a flow chart describing the steps in the Intelligent Engine mechanism according to this invention. At Block 50, initialization is taking place, which sets the mechanism to a starting position, value, and configuration.

At Block 52, a Process Qualification mechanism is designed to eliminate the potential misuse of the control system. Its detailed design is described in FIG. 4. At Block 54, a Process Type Selection mechanism allows the user to enter the process type for the control loop. Its detailed design is described in FIG. 5. At Block 56, a Controller Selection and Auto-configuration mechanism is designed to automatically select the appropriate MFA controller and its parameters. Its detailed design is described in FIG. 6. At Block 58, a Control System inspection mechanism is used to check all the controller configuration and signal connections of the control system. Its detailed design is described in FIG. 12. At Block 60, the user is asked if it is ready to launch the controller. If yes, it will proceed to Block 62 and a Controller Ready Flag is set. This flag can also be interlocked with the Auto/Manual flag of the controller to turn the controller to automatic control mode. Otherwise, if the user is not ready to launch the controller or wants to make changes, the routine returns to the entry of Block 52.

Figure 4:
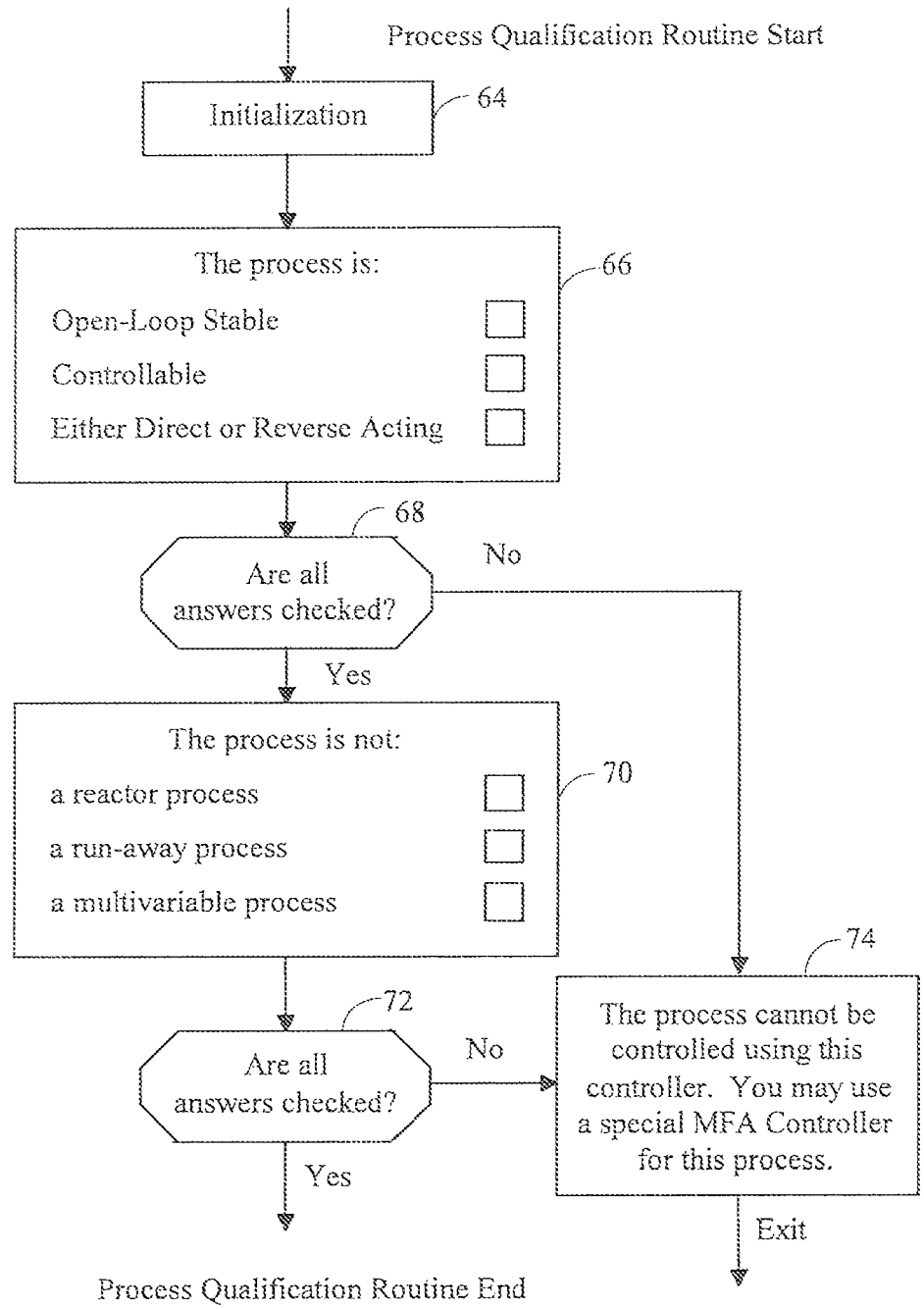
FIG. 4 is a flow chart describing the steps for the Process Qualification mechanism according to this invention.

FIG. 4 is a flow chart describing the steps in the Process Qualification mechanism according to this invention. At Block 64, initialization is taking place. At Block 66, the user needs to verify that the process is (1) controllable, (2) open-loop stable, and (3) either direct-acting or reverse-acting. These three basic conditions are defined in the following. Controllable means that the controller output u(t) used as the process input is capable of moving the process output x(t) to any position within its pre-defined range in a finite time. Open-loop stable means that for any hounded process input, the process output is also bounded. Either direct-acting or reverse-acting means that the process does not change its sign within the operating range.

At Block 68, if the user cannot verify that the process meets the three basic conditions, the routine goes to Block 74 telling the user that the process is not controllable using this controller and then exits the Intelligent Engine mechanism. Otherwise, it will continue to Block 70, where more process verification is taking place. Based on the safety and suitability considerations, the Dream Controller should not be used for certain processes. Therefore, the user needs to verify that the process is not (1) a reactor process, (2) a run-away process, and (3) a seriously coupled multivariable process. The temperature of a chemical reactor is typically a run-away process that is not only difficult to control but also dangerous. A multivariable process where its variables are seriously coupled could be controlled by using MIMO MFA controllers. At Block 72, the answers are checked. If the user can verify that the process meets the conditions, the routine ends successfully. Otherwise, it goes to Block 74 and then exits the intelligent Engine mechanism.

Figure 5:
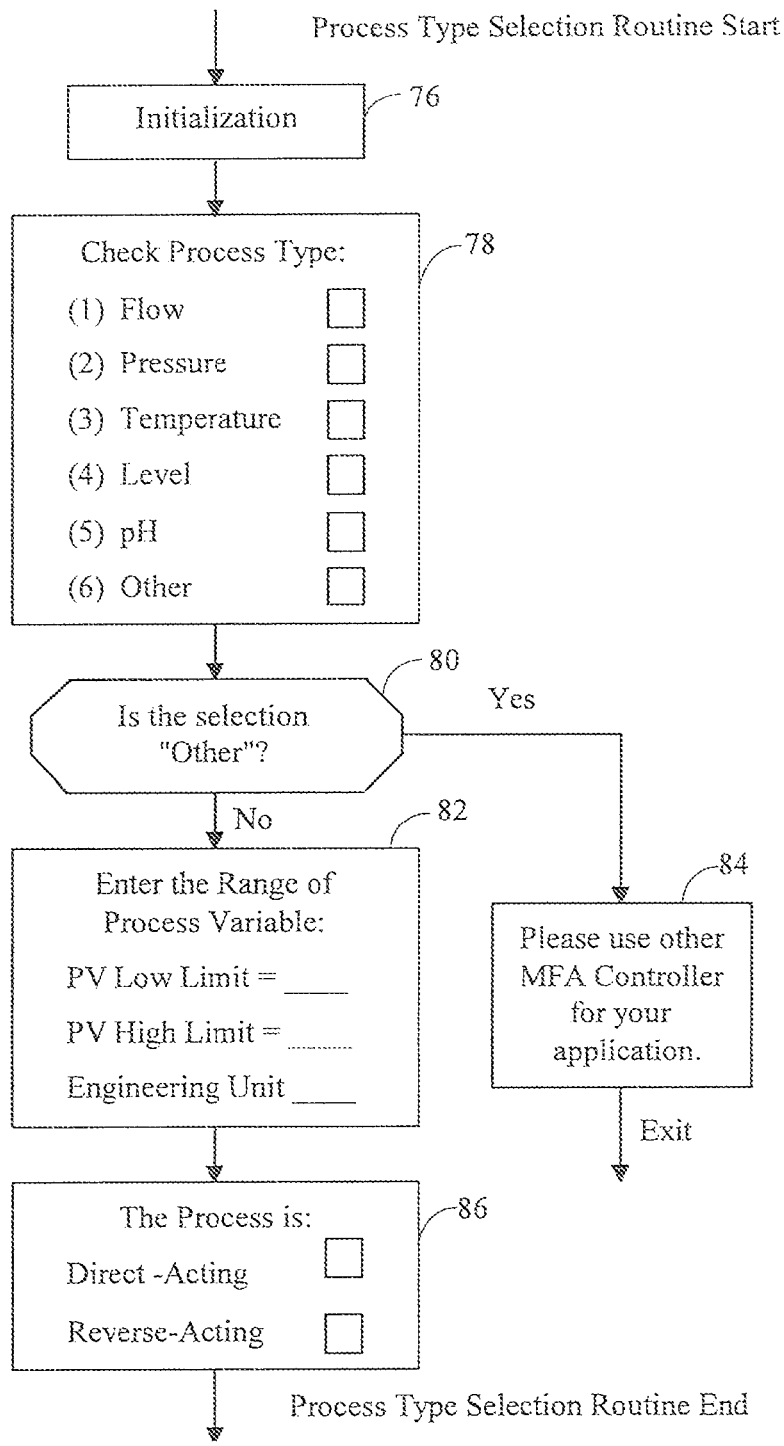
FIG. 5 is a flow chart describing the steps for the Process Type Selection mechanism according to this invention.

FIG. 5 is a flow chart describing the steps for the Process Type Selection mechanism according to this invention. At Block 76, initialization is taking place. At Block 78, the user is asked to select the process type that includes (1) Flow, (2) Pressure, (3) Temperature, (4) Level, (5) pH, and (6) Other. At Block 80, the selection is checked. If selection "Other" is made, the routine goes to Block 84, where the user is directed to use other types of MFA controllers. Then the routine exits the Intelligent Engine mechanism. When a selection for (1) to (5) is made, at Block 82, the user needs to enter the Range of the Process Variable and Engineering Unit. For instance, for a temperature process, PV Low Limit and PV High Limit are entered and the unit of C (Celsius) or F (Fahrenheit) is specified. At Block 86, the user needs to select whether the process is (1) Direct-acting, or (2) Reverse-acting. Then the Process Acting Type is saved as part of the controller configuration.

Figure 6:
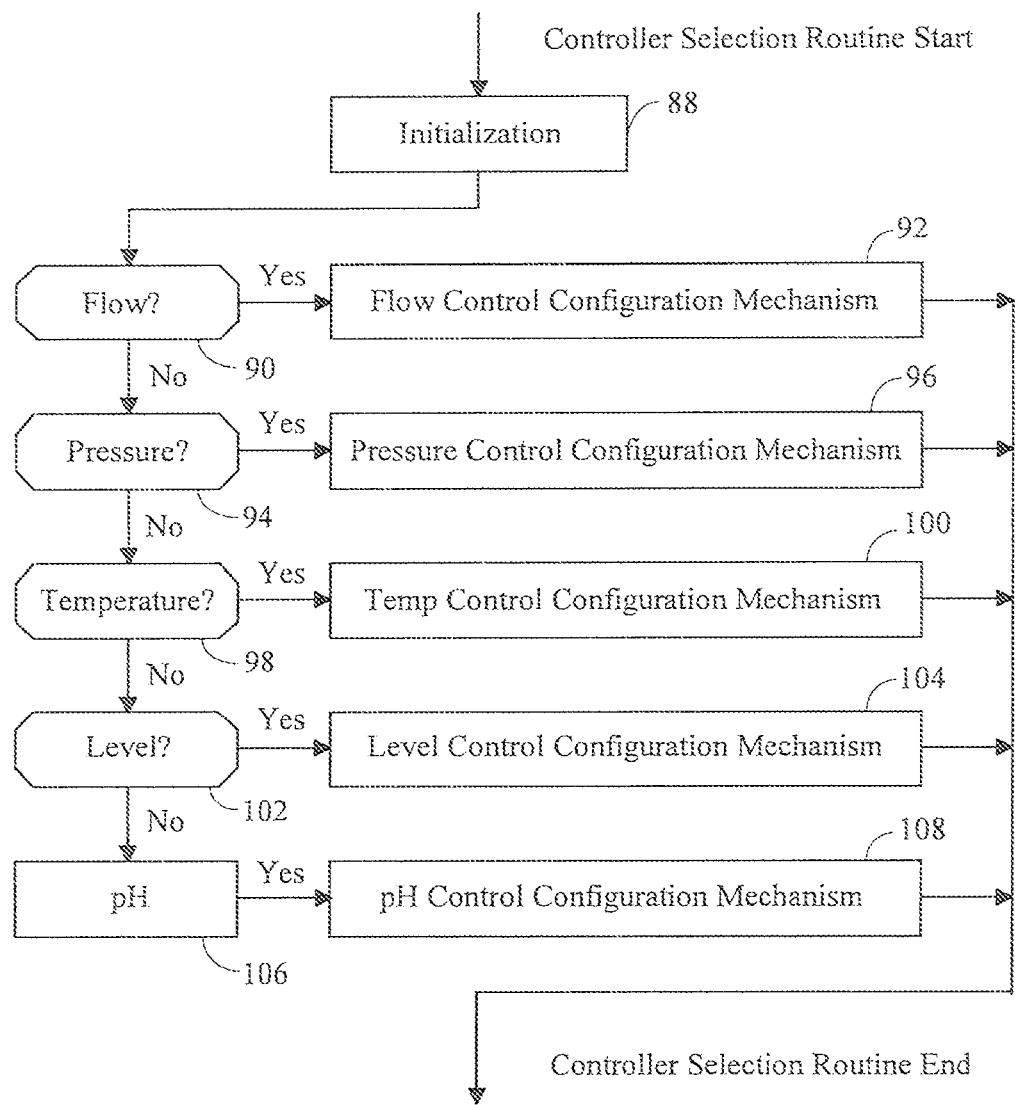
FIG. 6 is a flow chart describing the steps for the Controller Selection and Auto configuration mechanism according to this invention.

FIG. 6 is a flow chart describing the steps for the Controller Selection and Auto-configuration mechanism according to this invention. At Block 88, initialization is taking place. At Blocks 90, 94, 98, 102, and 106, the routine branches to the corresponding control configuration mechanisms 92, 96, 100, 104, and 108 for flow, pressure, temperature, level, and pH processes, respectively. After running the selected Control Configuration mechanism routine, the program exits the Controller Selection and Auto-configuration mechanism routine.

We now describe the detailed controller selection and configuration for each of the process types in the following.

1. Flow Control

Comparing flow, pressure, temperature, level, and pH, the flow loop is probably the least difficult to control but has the largest number of loops because a continuous process is about moving material flows from the beginning of the process to the end. Typically, the flow loop is controlled by manipulating a valve, a variable frequency drive (VFD), or a pump.

It is relatively easy to control a flow loop because it is naturally a first-order process with a small delay time. However, in flow control, the commonly used actuators are all nonlinear components by nature. (1) A control valve is almost never a linear component. It can have a concave, convex, or S-shaped nonlinear relationship between its input and output. Some even have hysteresis behavior making the problem much worse; (2) A variable frequency drive (VFD) saves energy but is naturally a nonlinear device; and (3) A pump driven by a pulse-width modulator (PWM) based on the duty cycles does not necessarily have a linear relationship with the flow. In addition, the inevitable wear and tear of the actuator can make the nonlinear behavior worse. Therefore, the challenge for flow control is mainly how to control a nonlinear process with stringent control performance requirements.

Figure 7:
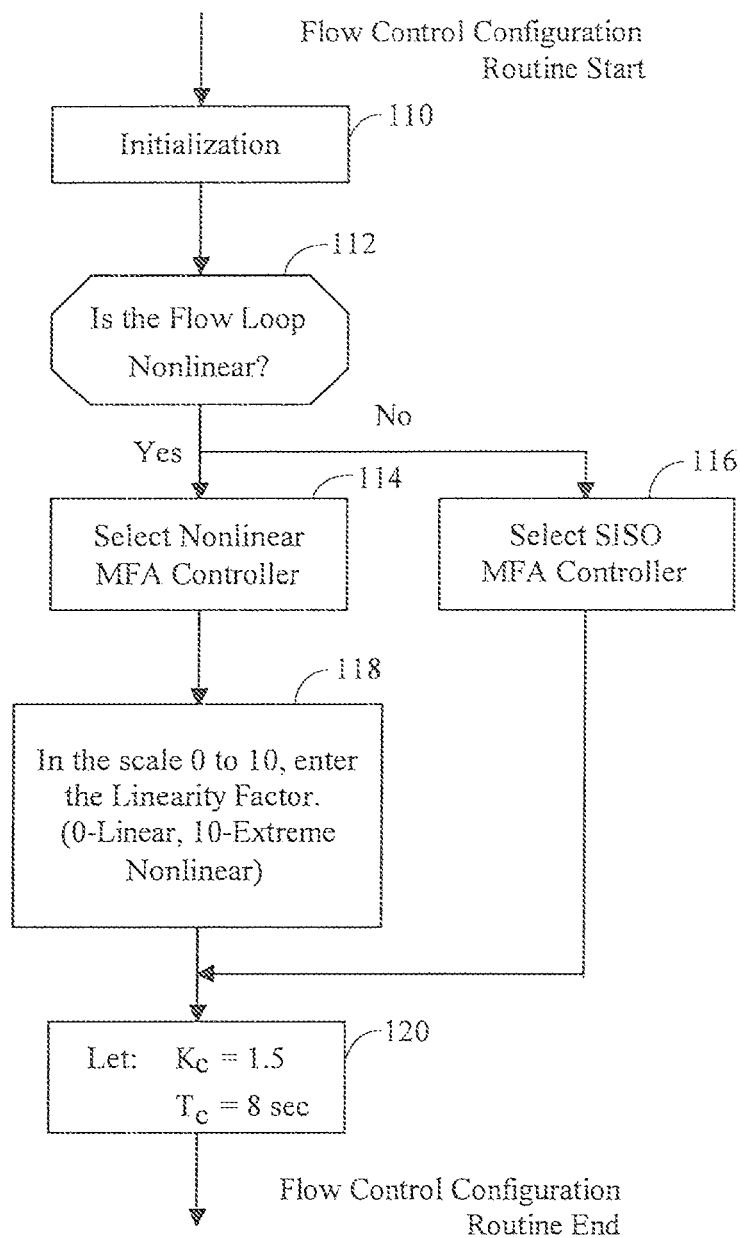
FIG. 7 is a flow chart describing the steps for the Flow Control Configuration mechanism according to this invention.

FIG. 7 is a flow chart describing the steps for the Flow Control Configuration mechanism according to this invention. At Block 110, initialization is taking place. At Block 112, the user specifies whether or not the flow process is nonlinear. If nonlinear, the Nonlinear MPA controller is selected at Block 114. Otherwise, the SISO MFA controller is selected at Block 116. At Block 118, the user is asked to enter a value that describes the degree of nonlinearity on a scale from 0 to 10, 0 being linear, and 10 being extremely nonlinear. This parameter is called Linearity Factor for the Nonlinear MFA controller. At Block 120, the MFA controller is configured with Kc=2 and Tc=8 seconds, where Kc is the MFA controller gain, and Tc is the time constant. After that, the routine exits.

2. Pressure Control

Pressure is an important process variable because it provides a critical condition for boiling, chemical reaction, distillation, extrusion, vacuuming, and air conditioning. Poor pressure control can cause major safety, quality, and productivity problems. Overly high pressure inside a sealed vessel can cause an explosion. Therefore, it is desirable to keep pressure in good control and maintained within its safety limits.

A pressure loop may include bad behavior such as: (1) nonlinear, (2) open-loop oscillating, (3) multivariable with serious coupling to other process variables, (4) large time delay, and (5) large load changes. The Dream Controller is not suitable to control a pressure process that is multivariable or has large time delays. A MIMO (Multi-input-multi-output) MFA controller is suitable to control a multivariable process, and the Anti-delay MFA controller is suitable to control a process with large time delays.

Figure 8:
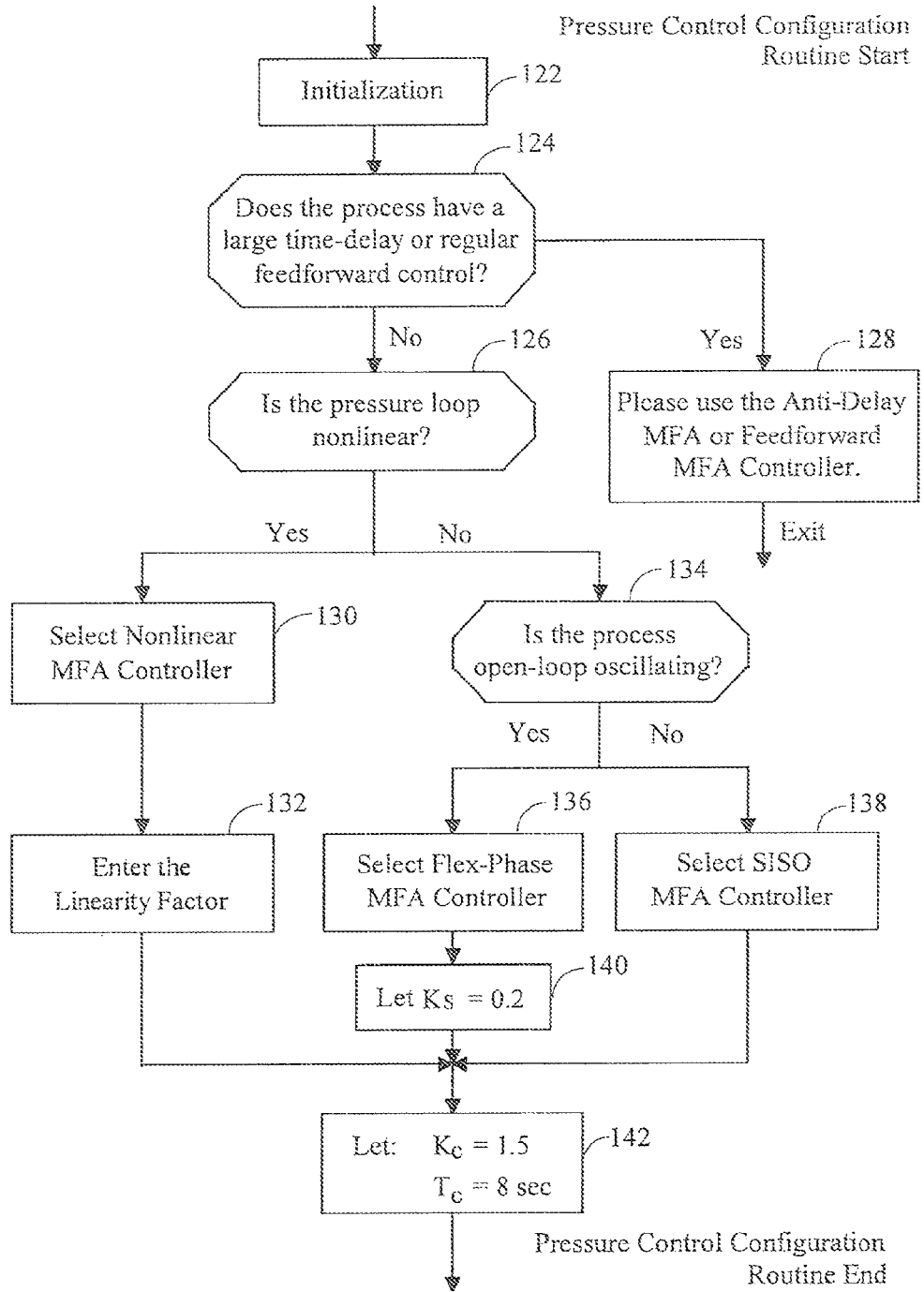
FIG. 8 is a flow chart describing the steps for the Pressure Control Configuration mechanism according to this invention.

FIG. 8 is a flow chart describing the steps for the Pressure Control Configuration mechanism according to this invention. At Block 122, initialization is taking place. At Block 124, the user is asked if the pressure loop has a large time delay or requires feedforward control. If yes, at Block 128, the user is advised to use the Anti-delay MFA controller or Feedforward MFA controller which are not part of the Dream Controller. In these cases, more detailed configuration and design are required. For instance, a controller for controlling the steam pressure of a boiler for power generation requires careful design and configuration. The routine then exits the Intelligent Engine mechanism.

At Block 126, the user specifies whether or not the pressure process is nonlinear. If yes, the Nonlinear MFA controller is selected at Block 130. At Block 132, the user enters the Linearity Factor for the Nonlinear MFA controller. If the pressure process is not nonlinear, at Block 134, the user specifies whether or not the process is open-loop oscillating. If yes, the Flex-phase MFA controller is selected at Block 136 and its Anti-overshoot constant Ks is configured with a value of 0.2 at Block 140. If the pressure process is neither nonlinear nor open-loop oscillating, a regular SISO MFA is selected at Block 138. At last, the MFA controller is configured with Kc=2 and Tc=8 seconds at Block 142, and then the routine exits.

3. Temperature Control

Temperature is an important process variable because it provides a critical condition for combustion, chemical reaction, fermentation, drying, calcination, distillation, concentration, extrusion, crystallization, and air conditioning. Poor temperature control can cause major safety, quality, and productivity problems. Although highly desirable, it is often difficult to control the temperature due to one or more of the following reasons: (1) very slow, (2) time-varying, (3) large time delay, (4) multivariable with serious coupling to other process variables, (5) large load changes, (6) dynamical changes due to fuel change and other uncertainties, (7) nonlinear, (8) high-speed, (9) single-input-multi-output (SIMO). (10) multi-input-single-output (MISO), (11) run-away, etc. Various MFA controllers have been developed to deal with these difficulties. However, as a general-purpose controller, the Dream Controller is not suitable to control the most problematic temperature processes. Therefore, extra screening is necessary when selecting and configuring a temperature controller.

Figure 9:
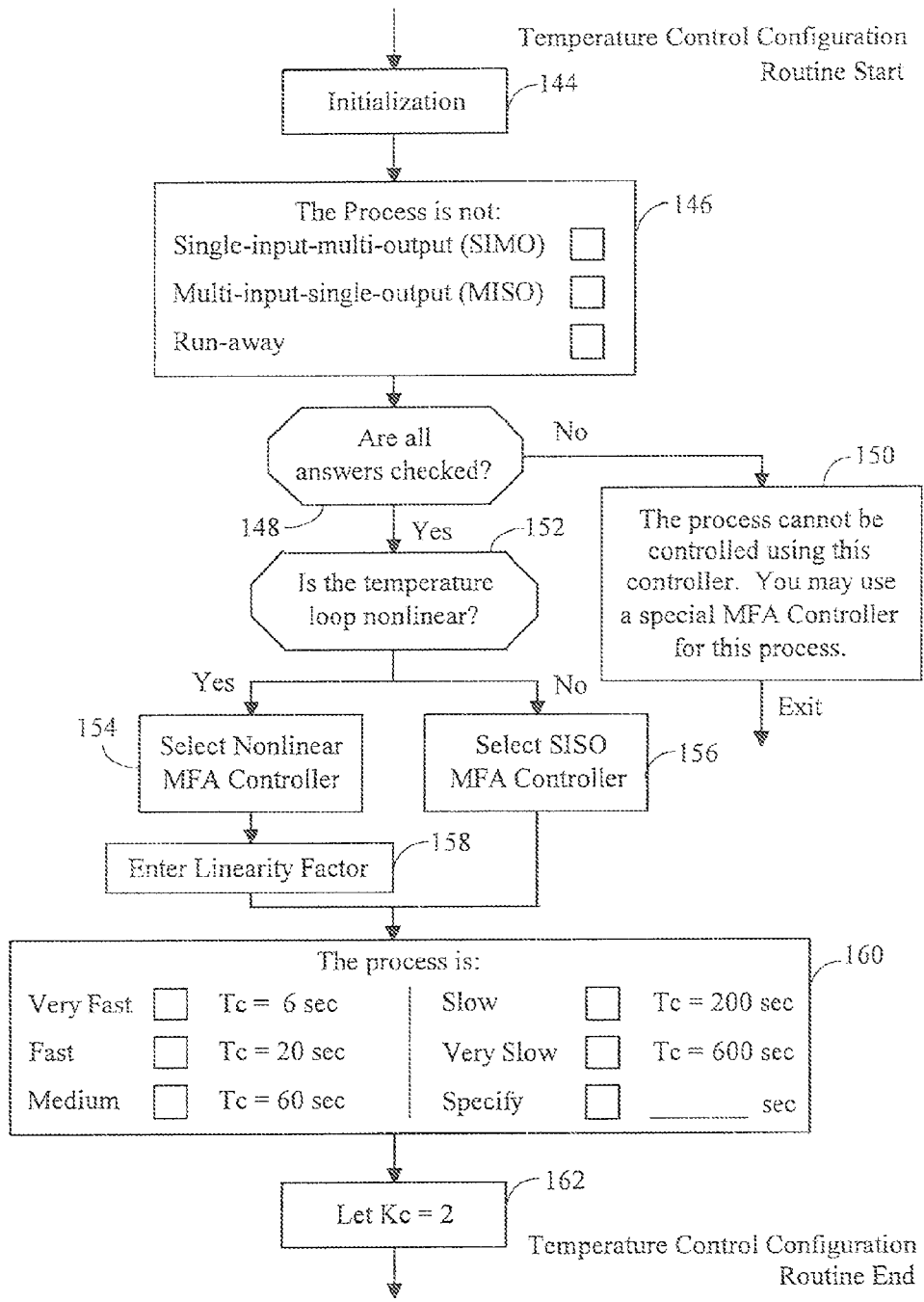
FIG. 9 is a flow chart describing the steps for the Temperature Control Configuration mechanism according to this invention.

FIG. 9 is a flow chart describing the steps for the Temperature Control Configuration mechanism according to this invention. At Block 144, initialization is taking place. At Block 146, the user is asked to verify that the temperature process is not a single-input-multi-output (SIMO) process, or a multi-input-single-output (MISO) process, or a run-away process. At Block 148, this verification is checked. If the result is negative, at Block 150, the user is advised that the process cannot be controlled using this controller and a special MFA controller is required. Then the routine exits the Intelligent Engine mechanism.

After the screening, at Block 152, the user is asked if the temperature process is nonlinear. If yes, the Nonlinear MFA controller is selected at Block 154. Otherwise, a SISO MFA controller is selected at Block 156, At Block 158, the user enters the Linearity Factor for the Nonlinear MFA controller. At Block 160, the user needs to select if the process is (1) very fast, (2) fast, (3) medium, (4) slow, and (5) very slow. Based on the selections of (1) to (5), the corresponding time constant Tc as listed in Block 160 is configured for the MFA controller. For option (6), the user needs to enter the estimate time constant of the process. For instance, the temperature loop of a rapid thermal processing (RTP) system may have a 0.5 second time constant, and the temperature loop of a large HVAC system may have a time constant of several hours. At Block 162, the controller is configured with Kc=2, and then the routine exits.

4. Level Control

When compared to other control loops, the importance of the level loop is often over-looked. Typically, the level loop is controlled by manipulating the inflow or outflow of the operating unit, and is considered an easy loop to control. In general, it is not easy to properly tune a PID controller to achieve good level control under all operating conditions due to the potential inflow and outflow variations of the operating unit. Overly tight level control will result in too much movement of the flow loop, which can cause excessive disturbances to the downstream operating unit. Thus, a PID level controller is usually detuned to allow the level to fluctuate; so the variations of the outflow are minimized. However, the detuned PID cannot provide prompt control against large disturbances, which may result in safety problems during a plant upset. In addition, oscillations in level can cause the process to swing, which also results in a lower yield. The Robust MFA controller is well suited to control the level loop. It allows smooth material and energy transfers between the operating units; and also protects the levels from overflowing or becoming too dry during abnormal conditions.

Figure 10:
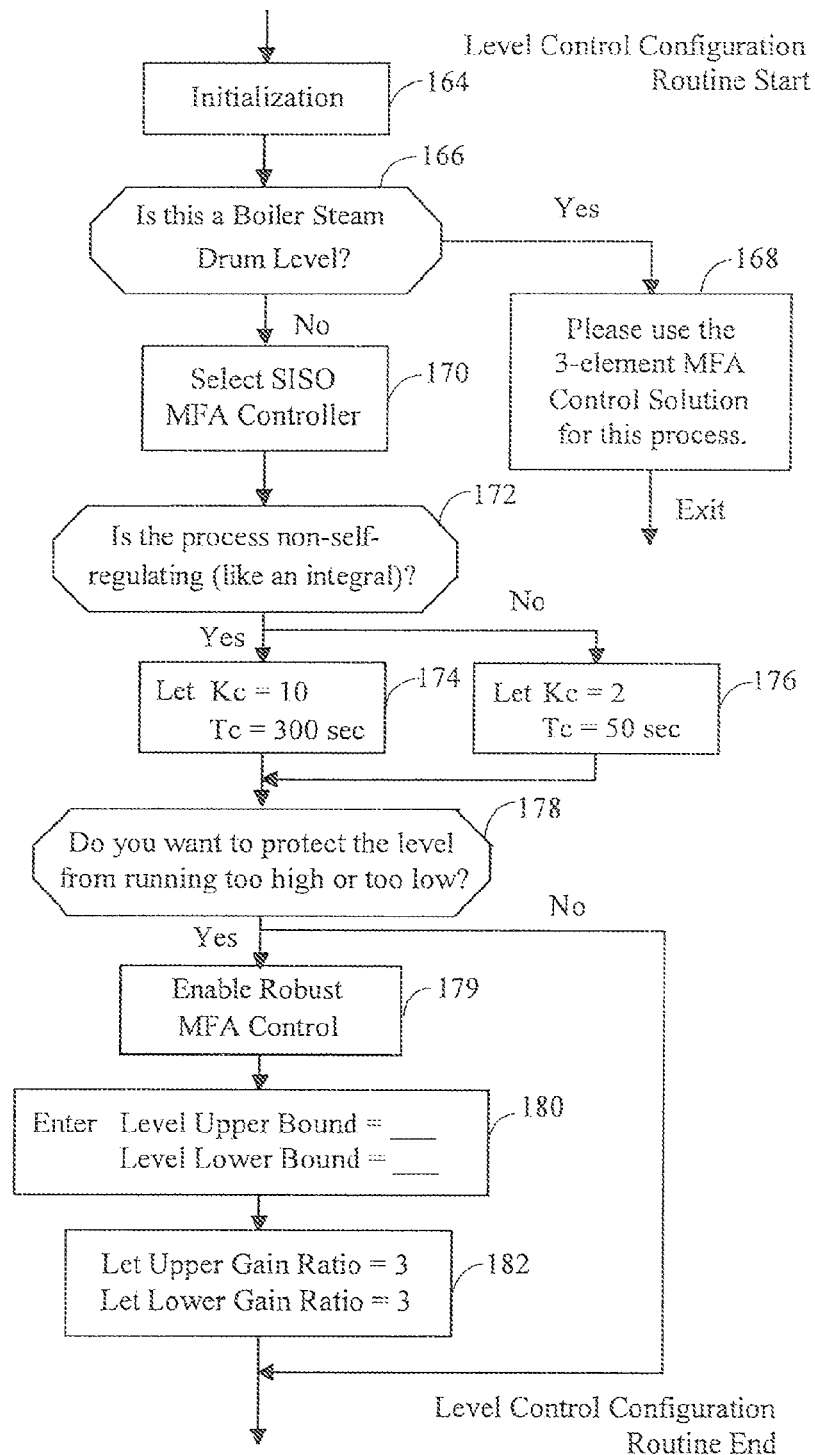
FIG. 10 is a flow chart describing the steps for the Level Control Configuration mechanism according to this invention.

FIG. 10 is a flow chart describing the steps for the Level Control Configuration mechanism according to this invention. At Block 164, initialization is taking place. At Block 166, the user is asked if it is a boiler steam drum level. If yes, at Block 168, the user is advised to use the 3-element MFA control solution. Then the routine exits the Intelligent Engine mechanism. Otherwise, at Block 170, the SISO MFA controller is selected. At Block 172, the user specifies if the level process is non-self-regulating. Non-self-regulating means that the level will continue to go up or down under a constant process input. If yes, the MFA controller is configured with Kc=10, and Tc=300 seconds at Block 174. If not, the MFA controller is configured with Kc=2, and Tc=50 seconds at Block 176. At Block 178, the user is asked if protection of level from running too high or too low is needed. If yes, at Block 179, the Robust MEA control feature is enabled. The Level Upper Bound and Level Lower Bound are entered at Block 180 for the Robust MFA controller. The Upper and Lower Bound are based on the level setpoint in its engineering unit. Recall that the PV Engineering Unit has been entered in the Process Selection mechanism. At Block 182, the Robust MFA controller is configured with Upper Gain Ratio=Lower Gain Ratio=3 and then the routine ends. If the level protection is not required, the routine goes directly to the end.

5. PH Control

Most industrial plants and municipal facilities generate a wastewater effluent that must be neutralized prior to discharge or reuse. Consequently, pH control is needed everywhere and yet most pH loops perform poorly. Results are inferior product quality, environmental pollution, and material waste. With ever increasing pressure to improve plant efficiency and tighter regulations in environmental protection, effective and continuous pH control is highly desirable.

Nevertheless, a pH loop is usually difficult to control because it is highly nonlinear. The pH value versus the reagent flow has a logarithmic relationship. Away from neutrality, the process gain is relatively small. Near neutrality where pH=7, the process gain can be a few thousand times higher. It is impossible for a fixed controller like PID to effectively control this process. In practice, most pH loops are in a "bang-bang" type of control with pumps cycling on and off which causes large oscillations. Since acid and caustic neutralize each other, over-dosing acid and caustic is prohibitively expensive. Statistics show that a poorly controlled pH process can cost tens of thousands of dollars in chemical usage each month, not counting the penalties imposed by violating government discharge codes.

The MFA pH controller can effectively control a wide range of pH processes within the full pH range. It is useful for wastewater neutralization and also enables automatic control of acid or alkaline concentration, both of which are critical quality variables for the chemical process industry.

Figure 11:
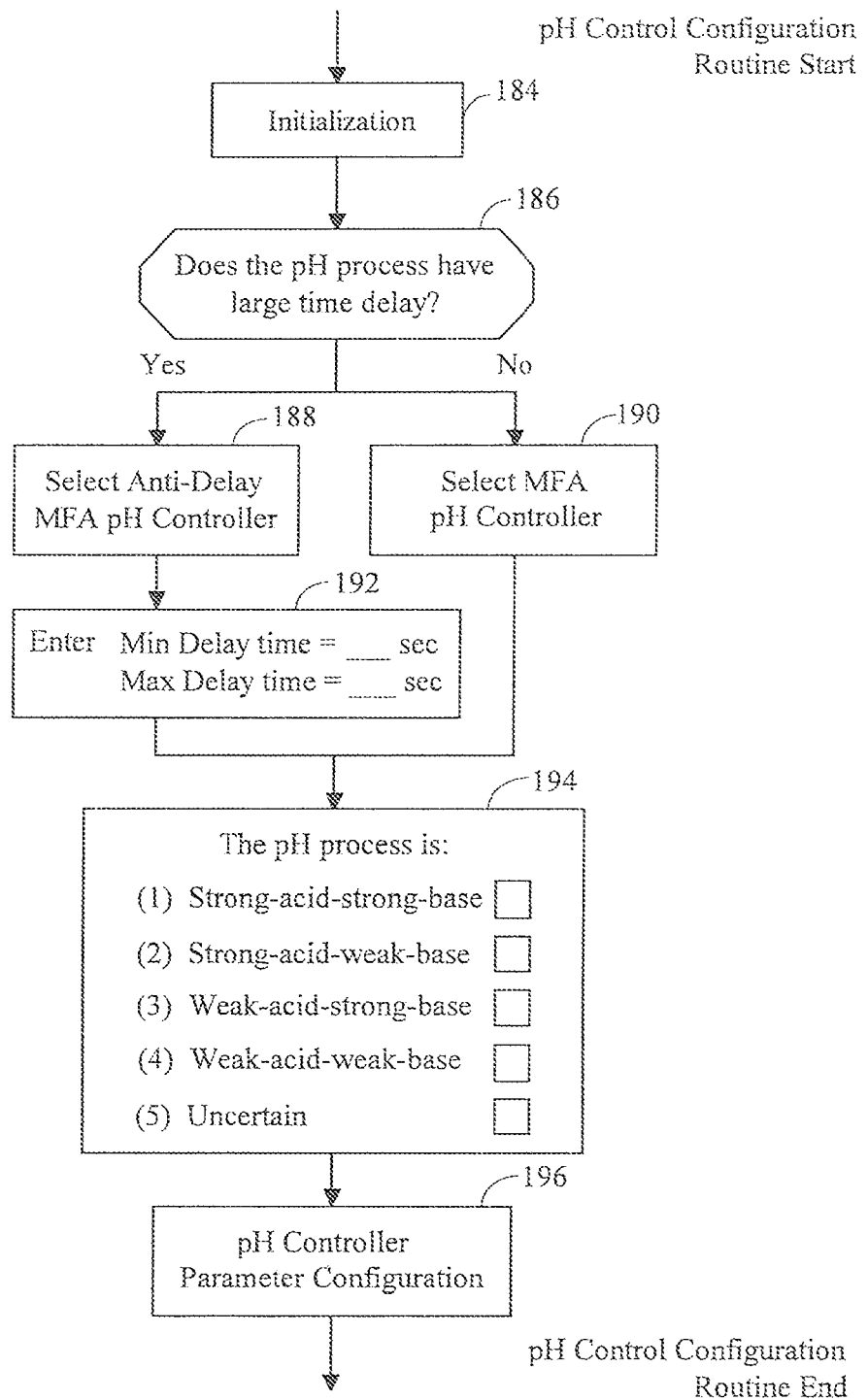
FIG. 11 is a flow chart describing the steps for the pH Control Configuration mechanism according to this invention.

FIG. 11 is a flow chart describing the steps for the pH Control Configuration mechanism according to this invention. At Block 184, initialization is taking place. At Block 186, the user is asked if the pH process has large time delays. If yes, the Anti-delay MFA pH controller is selected at Block 188. If not, the regular MFA pH controller is selected at Block 190. At Block 192, the user is asked to enter the Minimum Delay Time and Maximum Delay Time of the pH process. Since it is just a range of the delay time, it is easy to make the estimation. At Block 194, the user selects if the pH process is (1) Strong-acid-strong-base, (2) Strong-acid-weak-base, (3) Weak-acid-strong-base, (4) Weak-acid-weak-base, and (5) Uncertain. At Block 196, MFA pH controller parameters are configured based on the selection in Block 194. The parameters include the titration break point A and B, steep gain, flat gain, and time constant. As an example, these parameters can be configured with the values listed in Table 2.

TABLE 2

| pH Process | MFA pH Controller Parameters |
| --- | --- |
| Strong-acid-strong-base | Break A = 11, Break B = 3, Kc1 = 1, Kc2 = 0.001, Tc = 10 sec. |
| Strong-acid-weak-base | Break A = 8, Break B = 3, Kc1 = 1, Kc2 = 0.003, Tc = 10 sec. |
| Weak-acid-strong-base | Break A = 11, Break B = 6, Kc1 = 1, Kc2 = 0.003, Tc = 10 sec. |
| Weak-acid-weak-base | Break A = 8, Break B = 6, Kc1 = 1, Kc2 = 0.01, Tc = 20 sec. |
| Uncertain | Break A = 9, Break B = 5, Kc1 = 1, Kc2 = 0.001, Tc = 10 sec. |

From FIG. 7 to FIG. 11, the control selection and configuration steps for flow, pressure, temperature, level, and pH processes are described, respectively. The controller selection based on the process type and control challenge is summarized in Table 3.

TABLE 3

| Process Type | Control Challenge | Pre-configured MFA |
| --- | --- | --- |
| 1. Flow | a. Regular | a. SISO MFA controller |
| | b. Nonlinear | b. Nonlinear MFA controller |
| 2. Pressure | a. Regular | a. SISO MFA controller |
| | b. Nonlinear | b. Nonlinear MFA controller |
| | c. Open-loop oscillating | c. Flex-phase MFA controller |
| 3. Temp | a. Regular or large time lag | a. SISO MFA controller |
| | b. Nonlinear | b. Nonlinear MFA controller. |
| 4. Level | a. Regular | a. SISO MFA controller |
| | b. Non-self-regulating | b. SISO MFA controller |
| | c. Minimal OP change desirable | c. Robust MFA controller |
| 5. PH | a. No large time delay. | a. MFA pH controller |
| | b. There is a large time delay. | b. Anti-delay MFA pH controller |

Figure 12:
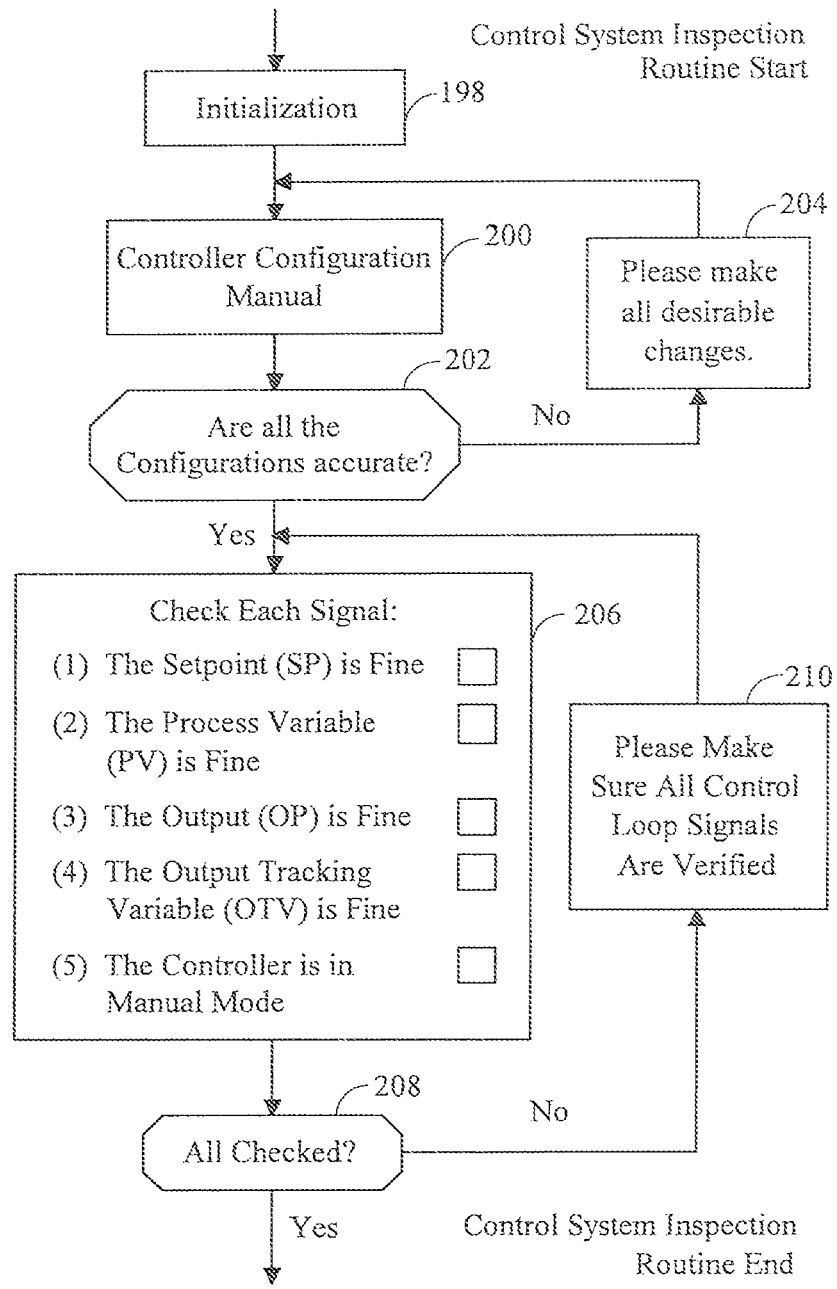
FIG. 12 is a flow chart describing the steps for the Control System inspection mechanism according to this invention.

FIG. 12 is a flow chart describing the steps for the Control System inspection mechanism according to this invention. It consists of the inspection for the controller configuration and the signals of the control system. At Block 198, initialization is taking place. At Block 200, a Controller Configuration Menu is shown that includes all information relating to the process selection and controller configuration. Table 4 shows an example of a temperature process to be controlled by a Nonlinear MFA controller.

TABLE 4

Process Info:

Process Type = Temperature, Control Challenge = Nonlinear.
PV Low Limit = 100, PV High Limit = 1000, Engineering Unit = Degree F.
Controller Info:

Selected Controller = Nonlinear MFA.
Configured Parameters: Kc = 2.0, Tc = 5.0 sec, NL Factor = 5.

At Block 202, the user is asked if the configuration is accurate. If not, it is advised to make all necessary changes at Block 204. The Controller Configuration Menu will show again to let the user enter changes. At Block 202, the user is asked if the configuration is accurate. If yes, configuration is done and the routine proceeds.

At Block 206, the user is asked to check the status of (1) Setpoint (SP), (2) Process Variable (PV), (3) Controller Output (OP), (4) Controller Output Tracking Variable (OTV), and (5) Controller Mode. All these signals have to be in their normal states before the controller can be launched to the automatic control mode. At Block 208, the user verifies that the system is OK. If not, at Block 210, it is advised to take all necessary actions to assure that all control loop signals are working properly. If yes, the routine ends with a successful control system configuration and inspection.

Inside the Intelligent Engine routine as shown in FIG. 3, the program continues from Block 58 to Block 60. If the user is ready to launch the controller, the program will proceed to Block 62 and a Controller Ready Flag is set.

The invention claimed is:

1. In a control system using Model-Free Adaptive (MFA) controllers to control process variables of a physical process, a method of automatically selecting and configuring an available MFA controller appropriate for a given process based on an input of known characteristics and behaviors of the process, comprising:
   a) qualifying the process as meeting basic controllability conditions based upon the input of known characteristics and behaviors of the process;
   b) inputting a process type as the type of process to be controlled; and
   c) following said inputting of the process type, the control system automatically selecting an appropriate MFA controller to control the process and automatically configuring parameters of the automatically-selected MFA controller.

2. The method of claim 1, said process qualification further comprising:
   i) inputting whether or not the process is open-loop stable, controllable and either direct-acting or reverse-acting, but not a reactor process, a run-away process, nor a multivariable process;
   ii) if the criteria of i) are satisfied, proceeding with said process type inputting; and
   iii) if the criteria of i) are not satisfied, advising the user to use a special MFA controller.

3. The method of claim 1, said process type inputting further comprising:
   i) inputting whether the process variable to be controlled is flow, pressure, temperature, level, pH or other;
   ii) if the process variable is neither flow, pressure, temperature, level nor pH, advising the user to use a special MFA controller, and
   iii) if the process variable is flow, pressure, temperature, level or pH, inputting the range and engineering unit of the process variable; inputting whether the process is direct-acting or reverse-acting; and configuring the selected MFA controller with a predetermined configuration mechanism appropriate for the inputted process variable type.

4. The method of claim 3, wherein if the process variable is flow, the method further comprising:
   iv) inputting whether the flow process is linear or nonlinear;
   v) if the flow process is linear, selecting a SISO MFA controller, and setting controller gain Kc=1.5 and time constant Tc=8 seconds; and
   vi) if the flow process is nonlinear, selecting a Nonlinear MFA controller, advising the user to enter the Linearity Factor in an integer value between 0 to 10, and setting controller gain Kc=1.5 and time constant Tc=8 seconds.

5. The method of claim 3, wherein if the process variable is pressure, the method further comprising:
   iv) inputting whether the pressure process has a large time delay or requires feedforward control;
   v) if the pressure process has a large time delay, advising the user to use an Anti-delay MFA controller;
   vi) if the pressure process requires feedforward control, advising the user to use a Feedforward MFA controller;
   vii) inputting whether the pressure process is nonlinear, and if it is, selecting a Nonlinear MFA controller, advising the user to enter the Linearity Factor in an integer value between 0 to 10, and setting controller gain Kc=1.5 and time constant Tc=8 seconds; and
   viii) if the pressure process is linear, inputting whether the process is open-loop oscillating; if it is not, selecting a SISO MFA controller, otherwise selecting a Flex-Phase MFA controller and setting the Anti-overshoot constant Ks=0.2; and in both cases setting controller gain Kc=1.5 and time constant Tc=8 seconds.

6. The method of claim 3, wherein if the process variable is temperature, the method further comprising:
   iv) inputting whether or not the temperature process is a single-input-multiple-output (SIMO), a multiple-input-single-output (MISO) or a run-away process;
   v) if the temperature process is SIMO, MISO or run-away, advising the user to use a special MFA controller;
   vi) if the temperature process is neither SIMO, MISO nor run-away, inputting whether the temperature process is linear; and
   vii) if the temperature process is linear, selecting a SISO MFA controller; if the temperature process is nonlinear, selecting a Nonlinear MFA controller and advising the user to enter the Linearity Factor in an integer value between 0 to 10; in both cases, setting time constant Tc in accordance with an inputted process speed classification, and setting controller gain Kc=2.

7. The method of claim 6, in which said inputted process speed. classification is substantially in accordance with the following table:

| Process Speed Classification | Time Constant Tc in Seconds |
|---|---|
| Very Fast | 6 |
| Fast | 20 |
| Medium | 60 |
| Slow | 200 |
| Very Slow | 600 |
| Specify | User Entered Value | wherein User Entered Value is the estimated process time constant in seconds entered by the user.

8. The method of claim 3, wherein if the process variable is level, the method further comprising:
   iv) inputting whether or not the level process is a boiler steam drum level, and if it is, advising the user to use the 3-element MFA control solution;
   v) if the level process is not a boiler steam drum level, selecting a SISO MFA controller and inputting whether or not the level process is self-regulating; and
   vi) if the level process is self-regulating, setting controller gain Kc=2 and time constant Tc=50 seconds; otherwise, setting controller gain Kc=10 and time constant Tc=300 seconds.

9. The method of claim 8, further comprising:
   vii) if level limit protection is desired, enabling robust MFA control, entering desired level upper bound and level lower bound, and setting the upper and lower gain ratios to 3.

10. The method of claim 3, wherein if the process variable is pH, the method further comprising:
   iv) inputting whether the pH process has a large time delay; if it does not, selecting an MFA pH controller; otherwise, selecting an Anti-delay MFA pH controller and entering the minimum and maximum delay time of the process; and
   v) in either case, inputting the relative strength of the acid and base relating to the pH process, and configuring the MFA with a corresponding predetermined controller parameter configuration.

11. The method of claim 10, in which said predetermined controller parameter configuration is substantially in accordance with the following table:

| Input of pH Process Relative Strength | MFA pH Controller Parameters |
|---|---|
| Strong-acid-strong-base | Break A = 11, Break B = 3, Kc1 = 1, Kc2 = 0.001, Tc = 10 sec. |
| Strong-acid-weak-base | Break A = 8, Break B = 3, Kc1 = 1, Kc2 = 0.003, Tc = 10 sec. |
| Weak-acid-strong-base | Break A = 11, Break B = 6, Kc1 = 1, Kc2 = 0.003, Tc = 10 sec. |
| Weak-acid-weak-base | Break A = 8, Break B = 6, Kc1 = 1, Kc2 = 0.01, Tc = 20 sec. |
| Uncertain | Break A = 9, Break B = 5, Kc1 = 1, Kc2 = 0.001, Tc = 10 sec. | wherein Break A is Titration Break Point A, Break B is Titration Break Point B, Kc1 is Flat Gain, Kc2 is Steep Gain, and Tc is Time Constant.

12. The method of claim 1, further comprising:
   d) displaying the selection and configuration of the selected MFA controller;
   e) verifying the correctness of the MFA controller selection and configuration;
   f) verifying all control loop signals including setpoint (SP), process variable (PV) controller output (OP), output tracking variable (OTV), and auto/manual mode; and
   g) advising user of the readiness of the MFA control system for launch.

13. A method of configuring a control system to control a flow process using Model-Free Adaptive (MFA) controllers, comprising:
   a) inputting whether the flow process is linear or nonlinear;
   b) if the flow process is linear, selecting a SISO MFA controller, and setting controller gain Kc=1.5 and time constant Tc=8 seconds; and
   c) if the flow process is nonlinear, selecting a Nonlinear MFA controller, advising the user to enter the Linearity Factor in an integer value between 0 to 10, and setting controller gain Kc=1.5 and time constant Tc=8 seconds wherein the control system is configured to control the flow process based upon the setting of the controller gain and time constant.

14. A method of configuring a control system to control a pressure process using Model-Free Adaptive (MWA) controllers, comprising:
   a) inputting whether the pressure process has a large time delay or requires feedforward control;
   b) if the pressure process has a large time delay, advising the user to use an Anti-delay MFA controller;
   c) if the pressure process requires feedforward control, advising the user to use a Feedforward MFA controller;
   d) inputting whether the pressure process is nonlinear, and if it is, selecting a Nonlinear MFA controller, advising the user to enter the Linearity Factor in an integer value between 0 to 10, and setting controller gain Kc=1.5 and time constant Tc=8 seconds; and
   e) if the pressure process is linear, inputting whether the process is open-loop oscillating; if it is not, selecting a SISO MFA controller, otherwise selecting a Flex-Phase MFA controller and setting the Anti-overshoot constant Ks=0.2; and in both cases setting controller gain Kc=1.5 and time constant Tc=8 seconds wherein the control system is configured based upon the setting of the two or more of controller gain, the time constant and Anti-overshoot constant.

15. A method of configuring a control system to control a temperature process using Model-Free Adaptive (MFA) controllers, comprising:
   a) inputting whether or not the temperature process is a single-input-multiple-output (SIMO), a multiple-input-single-output (MISO) or a run-away process;
   b) if the temperature process is SIMO, MISO or run-away, advising the user to use a special MFA controller;
   c) if the temperature process is neither SIMO, MISO nor run-away, inputting whether the temperature process is linear; and
   d) if the temperature process is linear, selecting a SISO MFA controller; if the temperature process is nonlinear, selecting a Nonlinear MFA controller and advising the user to enter the Linearity Factor in an integer value between 0 to 10; in both cases, setting time constant Tc in accordance with an inputted process speed classification, and setting controller gain Kc=2 wherein the control system is configured to control the temperature process based upon the setting of the controller gain and time constant.

16. The method of claim 15, in which said inputted process speed classification is substantially in accordance with the following table:

| Process Speed Classification | Time Constant Tc in Seconds |
|---|---|
| Very Fast | 6 |
| Fast | 20 |
| Medium | 60 |
| Slow | 200 |
| Very Slow | 600 |
| Specify | User Entered Value | wherein User Entered Value is the estimated process time constant in seconds entered by the user.

17. A method of configuring a control system to control a level process using Model-Free Adaptive (UFA) controllers, comprising:
   a) inputting whether or not the level process is a boiler steam drum level, and if it is, advising the user to use the 3-element MFA control solution;
   b) if the level process is not a boiler steam drum level, selecting a SISO MFA controller and inputting whether or not the level process is self-regulating; and
   c) if the level process is self-regulating, setting controller gain Kc=2 and time constant Tc=50 seconds; otherwise, setting controller gain Kc=10 and, wherein the control system is configured to control the level process based upon the setting of the controller gain and time constant.

18. The method of claim 17, further comprising:
   d) if level limit protection is desired, enabling robust MFA control, entering desired level upper bound and level lower bound, and setting the upper and lower gain ratios to 3.

19. A method of configuring a control system to control a pH process using Model-Free Adaptive (MFA) controllers, comprising:
   a) inputting whether the pH process has a large time delay; if it does not, selecting an MFA pH controller to control the pH process; otherwise, selecting an Anti-delay MFA pH controller to control the pH process; and entering the minimum and maximum delay time of the process; and
   b) in either case, inputting the relative strength of the acid and base relating to the pH process, and configuring the MFA with a corresponding predetermined controller parameter configuration.

20. The method of claim 19, in which said predetermined controller parameter configuration is substantially in accordance with the following table:

| Input of pH Process Relative Strength | MFA pH Controller Parameters |
|---|---|
| Strong-acid-strong-base | Break A = 11, Break B = 3, Kc1 = 1, Kc2 = 0.001, Tc = 10 sec. |
| Strong-acid-weak-base | Break A = 8, Break B = 3, Kc1 = 1, Kc2 = 0.003, Tc = 10 sec. |
| Weak-acid-strong-base | Break A = 11, Break B = 6, Kc1 = 1, Kc2 = 0.003, Tc = 10 sec. |
| Weak-acid-weak-base | Break A = 8, Break B = 6, Kc1 = 1, Kc2 = 0.01, Tc = 20 sec. |
| Uncertain | Break A = 9, Break B = 5, Kc1 = 1, Kc2 = 0.001, Tc = 10 sec. | wherein Break A is Titration Break Point A, Break B is Titration Break Point B, Kc1 is Flat Gain, Kc2 is Steep Gain, and Tc is Time Constant.

* * * * *